US012600336B2

(12) United States Patent
Treffer

(10) Patent No.:  US 12,600,336 B2
(45) Date of Patent:  Apr. 14, 2026

(54) METHOD FOR CONTROLLING A BRAKING SYSTEM, BRAKING SYSTEM AND MOTOR VEHICLE

(71) Applicant: AUDI AG, Ingolstadt (DE)

(72) Inventor: Ulrich Treffer, Neustadt a. d. Donau (DE)

(73) Assignee: AUDI AG, Ingolstadt (DE)

( * ) Notice: Subject to any disclaimer, the term of this patent is extended or adjusted under 35 U.S.C. 154(b) by 117 days.

(21) Appl. No.: 18/470,757

(22) Filed: Sep. 20, 2023

(65) Prior Publication Data

US 2024/0149849 A1      May 9, 2024

(30) Foreign Application Priority Data

Nov. 8, 2022     (DE) .......................... 102022129424.2

(51) Int. Cl.
    *B60T 13/66*        (2006.01)
    *B60T 7/04*         (2006.01)
                (Continued)
(52) U.S. Cl.
    CPC ............ *B60T 13/662* (2013.01); *B60T 7/042* (2013.01); *B60T 8/326* (2013.01); *B60T 8/4081* (2013.01);
                (Continued)
(58) Field of Classification Search
    CPC ........ B60T 7/042; B60T 8/326; B60T 8/4081; B60T 8/4872; B60T 13/66; B60T 13/662;
                (Continued)

(56) References Cited

U.S. PATENT DOCUMENTS 6,155,653 A * 12/2000 Borchert ............... B60T 13/662
                                                         303/116.1
6,158,825 A * 12/2000 Schunck ............... B60T 8/4059
                                                         303/11
                (Continued)

FOREIGN PATENT DOCUMENTS

CN          105172771 A      12/2015
CN          113665538 A      11/2021
                (Continued)

OTHER PUBLICATIONS

Search Report issued on Aug. 2, 2023, in corresponding German Application No. 102022129424.2, 12 pages.
                (Continued)

*Primary Examiner* — John M Zaleskas
(74) *Attorney, Agent, or Firm* — Maier & Maier, PLLC

(57)                ABSTRACT

A method for controlling a braking system of a motor vehicle. The braking system includes hydraulically actuated wheel brakes as well as a linear actuator and a pump as electrohydraulic pressure-generating devices, according to which, during a braking operation of the motor vehicle, a parameter describing an actual behavior of the braking system of the motor vehicle is monitored and compared with a stored threshold value. In the event that the monitored parameter exhibits a defined deviation from the threshold value, the linear actuator and the pump are switched to synchronous operation by simultaneously operating the linear actuator and the pump and applying brake pressure to the hydraulically actuated wheel brakes via the linear actuator and the pump. A current volume consumption of the linear actuator is detected as a parameter describing the actual behavior of the braking system of the motor vehicle.

8 Claims, 1 Drawing Sheet

100

Monitoring a parameter describing an actual behavior of the braking system of the motor vehicle — 102

Comparing the parameter with a stored threshold value — 104

Switching the linear actuator and the pump to synchronous operation if the parameter exhibits a defined deviation from the threshold value — 106

Applying brake presure to hydraulically actuated wheel brakes via the linear actuator and the pump — 108

(51) Int. Cl.

| | |
|---|---|
| *B60T 8/32* | (2006.01) |
| *B60T 8/40* | (2006.01) |
| *B60T 8/48* | (2006.01) |
| *B60T 13/68* | (2006.01) |
| *B60T 13/74* | (2006.01) |

(52) U.S. Cl.
CPC .......... *B60T 8/4872* (2013.01); *B60T 13/686* (2013.01); *B60T 13/745* (2013.01); *B60T 2270/404* (2013.01)

(58) Field of Classification Search
CPC ...... B60T 13/686; B60T 13/745; B60T 17/18; B60T 2270/404
See application file for complete search history.

(56) References Cited

U.S. PATENT DOCUMENTS

| | | | | |
|---|---|---|---|---|
| 2013/0026817 | A1* | 1/2013 | Morishita | B60T 13/686 303/3 |
| 2013/0158783 | A1* | 6/2013 | Zimmermann | G06F 17/00 701/34.4 |
| 2014/0203626 | A1* | 7/2014 | Biller | B60T 7/02 303/14 |
| 2015/0020520 | A1* | 1/2015 | Feigel | B60T 8/3655 60/534 |
| 2016/0009267 | A1* | 1/2016 | Lesinski, Jr. | B60T 7/12 303/10 |
| 2016/0023644 | A1* | 1/2016 | Feigel | B60T 8/4081 303/3 |
| 2016/0052500 | A1* | 2/2016 | Foitzik | G01F 1/00 73/54.01 |
| 2016/0375887 | A1* | 12/2016 | Baehrle-Miller | B60T 8/885 303/15 |
| 2017/0307065 | A1* | 10/2017 | Buchmann | F16H 57/0439 |
| 2018/0029574 | A1* | 2/2018 | Mannherz | B60T 13/686 |
| 2019/0047538 | A1* | 2/2019 | Lesinski | B60T 8/885 |
| 2020/0114894 | A1* | 4/2020 | Leiber | B60T 17/04 |
| 2020/0139948 | A1* | 5/2020 | Leiber | B60T 8/176 |
| 2020/0198607 | A1* | 6/2020 | Weitze | B60T 8/4081 |
| 2020/0361439 | A1* | 11/2020 | Neu | B60T 13/146 |
| 2020/0398805 | A1* | 12/2020 | Strengert | B60T 13/686 |
| 2020/0406878 | A1* | 12/2020 | Friedrich | B60T 13/662 |
| 2021/0046909 | A1* | 2/2021 | Saotome | B60T 13/686 |
| 2024/0001899 | A1* | 1/2024 | Stanojkovski | B60T 13/686 |

FOREIGN PATENT DOCUMENTS

| | | |
|---|---|---|
| CN | 113771811 A | 12/2021 |
| DE | 102016202105 A1 | 8/2016 |
| DE | 102017200955 A1 | 7/2018 |
| DE | 102017113563 A1 | 12/2018 |
| DE | 102019213057 A1 * | 3/2021 |
| DE | 102020214972 A1 | 6/2022 |
| DE | 102022203990 A1 | 7/2023 |
| JP | 2010036785 A * | 2/2010 |
| JP | 2016037160 A * | 3/2016 |

OTHER PUBLICATIONS

Extended European Search Report issued on Feb. 27, 2024, in corresponding European Application No. 23195867.9, 12 pages.

\* cited by examiner

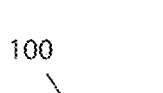

100

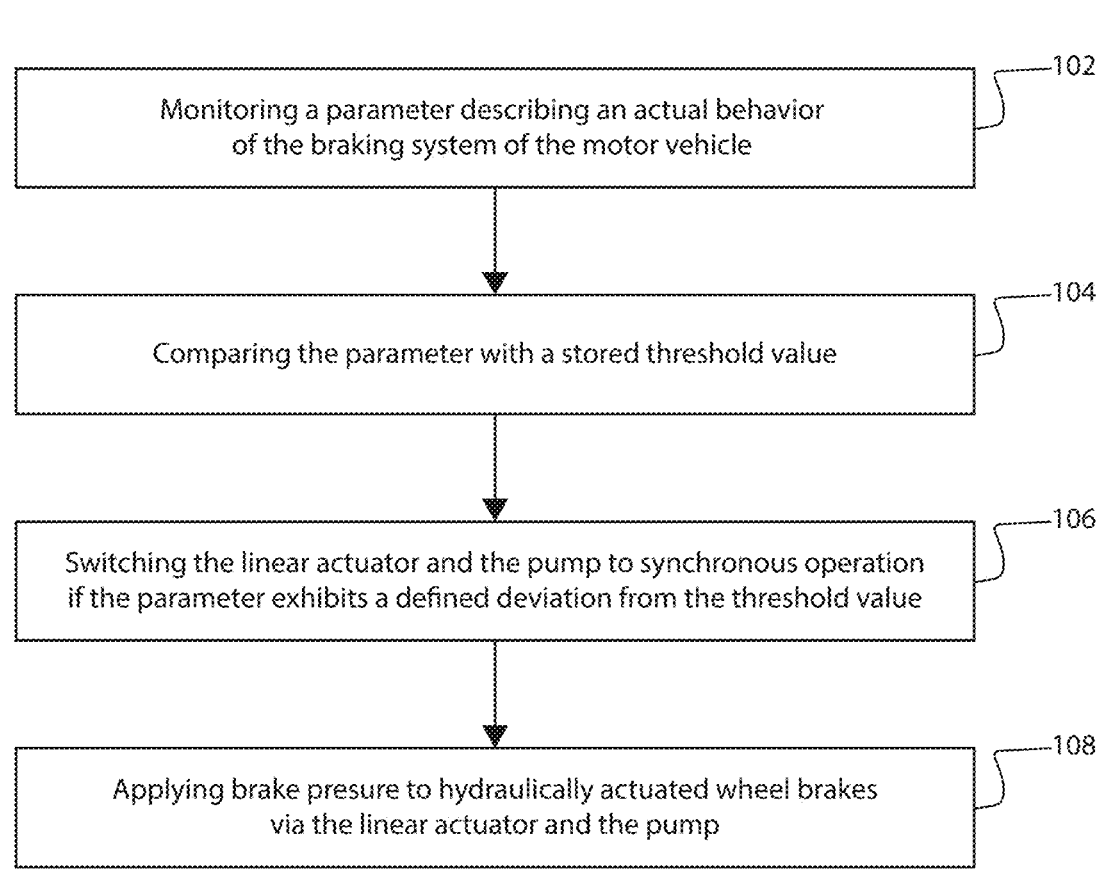

Monitoring a parameter describing an actual behavior
of the braking system of the motor vehicle          —102

Comparing the parameter with a stored threshold value          —104

Switching the linear actuator and the pump to synchronous operation
if the parameter exhibits a defined deviation from the threshold value          —106

Applying brake presure to hydraulically actuated wheel brakes
via the linear actuator and the pump          —108

METHOD FOR CONTROLLING A BRAKING SYSTEM, BRAKING SYSTEM AND MOTOR VEHICLE

FIELD

The invention relates to a method for controlling a braking system of a motor vehicle, a braking system, and a motor vehicle.

BACKGROUND

So-called electrohydraulic braking systems are known to be characterized by the fact that a braking request from the driver is sensed or detected by means of an appropriately designed sensor system on the brake pedal, and that an electrohydraulic pressure-generating device is electronically controlled on the basis of the sensed or detected braking request, by means of which the necessary braking pressure is generated in the hydraulic wheel brakes. Due to the electrical signal transmission via cable, i.e. "by wire", such braking systems are also referred to as brake-by-wire systems.

In the case of autonomous driving vehicles, in particular autonomous driving vehicles starting from level 3, and in the case of vehicles with a brake-by-wire system without a mechanical/hydraulic actuation option in the event of a fault ("true-brake-by-wire"), the electro-hydraulic pressure generation devices of the braking system must be designed redundantly for safety reasons. For this purpose, the brake circuits supplying the hydraulic brakes with brake pressure can be pressurized via a primary system comprising a first electrohydraulic pressure-generating device and a redundant secondary system, provided with a second electrohydraulic pressure-generating device.

Usually, as the first pressure-generating devices, linear actuators or so-called plungers are used, which can displace a fixed volume without interruption, i.e., without suction. The design of the braking system is typically such that the volume of the linear actuator is sufficient to achieve the blocking pressure level. Thus, the maximum pressure of the linear actuator is typically between 180-220 bar. At least the brake fluid volume capacity of the braking system (especially of the wheel brakes), as well as a defined air content in the brake fluid, must be taken into account. In addition, the opening of the venting valves on the wheel lines has a negative influence on the volume balance. This amount must also be taken into account to a certain extent. In summary, the braking system is nowadays designed with regard to the volume of the linear actuator in such a way that the linear actuator only has to suck in in specific cases, e.g. due to control of the venting valves or due to leakage.

If, in addition to the linear actuator, a second electrohydraulic pressure-generating device, which can be controlled in synchronous operation with the linear actuator, such as a pump, is now installed in brake-by-wire braking systems, the braking system has so far been oversized in terms of volume budget, since all the effects described above affecting the required brake fluid volume have to be taken into account in the design of the linear actuator. This means that the linear actuator is correspondingly larger, which in turn means a higher component weight and increased space requirements, with associated correspondingly higher costs.

A generic method for controlling a braking system of a motor vehicle, according to which the hydraulically actuated wheel brakes are controlled via a first pressure-generating device in the form of a linear actuator and a second pressure-generating device in the form of a pump is disclosed in DE 10 2020 214 972 A1. The method is characterized by the fact that a brake request signal is monitored and that if the rate of change of the brake request signal is greater than a threshold value—i.e. in the case of rapid pedal actuation or "panic braking"—the linear actuator and the pump are switched to synchronous operation, so that a requested brake pressure can be achieved particularly quickly, whereby the braking distance of the motor vehicle can be efficiently reduced.

SUMMARY

The object of the invention is to develop a method for controlling a braking system of a motor vehicle in such a way that a linear actuator installed in the braking system can be dimensioned smaller with respect to the brake fluid volume that can be delivered without interruption.

BRIEF DESCRIPTION OF THE FIGURE

FIGURE shows an exemplary embodiment of a method for controlling a braking system of a motor vehicle.

DETAILED DESCRIPTION

According to the method 100 for controlling a braking system of a motor vehicle as shown in the FIGURE, the braking system comprises hydraulically actuated wheel brakes as well as a linear actuator and a pump, as electro-hydraulic pressure-generating devices. In a known manner, at step 102 a parameter describing or characterizing the actual behavior of the braking system is monitored during a braking process and compared with a stored threshold value at step 104, and at step 106—if the monitored parameter exhibits a defined deviation from the threshold value—the linear actuator and the pump are switched to synchronous operation by operating the linear actuator and the pump simultaneously and applying braking pressure to the hydraulically actuated wheel brakes via the linear actuator and the pump at step 108.

According to the invention, it is now provided that an actual volume consumption of the linear actuator is used as a parameter describing the actual behavior of the braking system during a braking process.

Since, according to the invention, the current volume consumption of the linear actuator is used as a parameter for switching to synchronous operation, it is advantageously ensured that the linear actuator can be provided with a smaller size, since a volume delivery appropriate to the load is ensured by means of the pump. Thus, it is now advantageously possible to design the linear actuator with regard to its volume in such a way that the volume of the linear actuator is sufficient to ensure the necessary blocking pressure level (usually approx. 100 bar) for most braking processes, e.g. >90%, since in the other remaining cases in which a higher blocking pressure level is required, the pump intervenes in a supporting manner, i.e. the pump delivers the additional volume to build up the braking pressure. The smaller dimensioning of the linear actuator has the effect of saving weight and requiring less installation space.

Preferably, the current volume consumption is compared with a fixed stored maximum volume consumption value, and the system switches to synchronous operation if the current volume consumption is $\geq$the maximum volume consumption value. For example, if the linear actuator has a total volume of $V_{tot}=15$ cm$^3$ and a value of 11 cm$^3$ has been stored as the maximum consumption value, the linear actuator and pump switch to synchronous operation if the detected current volume consumption is ≥11 cm³. Instead of an absolute maximum volume consumption value, it is of course also possible to provide a percentage value related to the total volume $V_{tot}$, i.e. for switching to synchronous operation when the current volume consumption≥x % of the total volume $V_{tot}$, for example current volume consumption≥75% $V_{tot}$.

A particularly preferred embodiment of the method according to the invention provides that, in addition to the current volume consumption of the linear actuator, a resulting current longitudinal acceleration of the motor vehicle is also detected and the current volume consumption is compared with a volume consumption threshold value, and in that—if the current volume consumption is ≥the volume consumption threshold value—synchronous operation is switched to, wherein the volume consumption threshold value is taken from a characteristic curve in which the longitudinal acceleration is plotted against the volume consumption of the linear actuator. The advantage of this embodiment is that even at low decelerations it can be identified whether the volume of the linear actuator is sufficient for a full deceleration or whether, if necessary, a requirement-based control of the pump is required. Possible supporting points of the characteristic curve could be, for example, longitudinal acceleration≥−4 m/s²; current volume consumption≥50% of the total volume $V_{tot}$, as well as longitudinal acceleration≥−6 m/s²; current volume consumption≥70% of the total volume $V_{tot}$.

A further embodiment is characterized in that, in addition to the current volume consumption of the linear actuator, a current braking pressure applied to the hydraulic wheel brakes is also detected, and in that the detected current braking pressure is compared with a stored limit braking pressure and the current volume consumption is compared with a stored volume consumption limit value, and in that—if the detected current braking pressure≤than the stored limit braking pressure and the current volume consumption≥than the stored volume consumption limit value−synchronous operation is switched to.

If, for example, the linear actuator has a total volume of $V_{tot}$=15 cm³, the stored limit brake pressure is 2 bar (=pressure required to overcome the air gap) and the stored volume consumption limit value $V_{limit}$ is e.g. $V_{limit}$=4 cm³, the linear actuator and pump are switched to synchronous operation in the method if the detected current volume consumption≥4 cm³ and the detected current brake pressure is ≤2 bar. Instead of an absolute volume consumption limit value, it is of course also possible to provide a percentage value related to the total volume $V_{tot}$, such as volume consumption limit $V_{limit}$=y % of the total volume $V_{tot}$, such as $V_{limit}$=25% of the total volume $V_{tot}$.

In order to ensure sufficient volume delivery by the pump in synchronous operation, according to a further preferred embodiment it is provided that the intensity of a control signal controlling the pump is read out from a characteristic curve in which the desired pump motor speed is plotted against the desired pressure build-up gradient or the desired volume flow of the brake fluid.

Another object of the invention is to develop a braking system for the wheels of a motor vehicle in such a way that the braking system requires less installation space and is lighter in weight.

In a known manner, the braking system comprises hydraulically actuated wheel brakes associated with the wheels, a primary system having a linear actuator as an electrohydraulic pressure-generating device for supplying the wheel brakes with brake pressure, and a secondary system which is redundant to the primary system, which has a pump as an electrohydraulic pressure-generating device and can be operated in synchronous operation with the primary system, for supplying the wheel brakes with brake pressure. In addition, the braking system comprises in a known manner a brake fluid reservoir containing or storing a hydraulic fluid, which is fluidically connected to the primary system and the secondary system, as well as a closed-loop controlling device for regulating/controlling the braking system.

The design of the braking system according to the invention has the effect that—as already explained—due to the control system according to the invention, the electrohydraulic pressure-generating device of the primary system, i.e. the linear actuator, can be dimensioned smaller. In addition to a lower component weight, the smaller size has in particular the advantage that the linear actuator is smaller and thus the braking system comprising the linear actuator requires less installation space.

Preferably, the regulating/controlling device is designed as a central regulating/controlling unit, which is set up to regulate/control both the linear actuator of the primary system and the pump of the secondary system. This has the advantage of enabling a particularly space-saving and weight-optimized design of the braking system.

An alternative design is characterized by a redundant design of the regulating/controlling device, i.e. two regulating/controlling units are provided, namely a primary regulating/controlling unit regulating/controlling the linear actuator and a secondary regulating/controlling unit regulating/controlling the pump. This advantageously ensures increased system reliability.

Another object of the invention is to develop a motor vehicle comprising a braking system in such a way that consumption-optimized driving is possible.

All explanations of the method for controlling the braking system according to the invention and of the braking system according to the invention can be applied analogously to the motor vehicle according to the invention, so that the advantages mentioned above, in particular a weight saving and thus a consumption-optimized operation of the motor vehicle, are also achieved with the latter.

The invention claimed is:

1. A method for controlling a braking system of a motor vehicle, wherein the braking system comprises hydraulically actuated wheel brakes and a linear actuator and a pump as electrohydraulic pressure-generating devices, the method comprising:

monitoring a current volume consumption of the linear actuator as a parameter describing an actual behavior of the braking system of the motor vehicle during a braking operation;

comparing the current volume consumption of the linear actuator with a volume consumption threshold value, wherein the volume consumption threshold value is a permanently stored maximum volume consumption value switching the linear actuator and the pump to a synchronous operation;

applying brake pressure to the hydraulically actuated wheel brakes via the linear actuator and the pump;

plotting a set pump motor speed as a function of a set pressure build-up gradient and a set volume flow of a brake fluid to produce a first characteristic curve; and obtaining a control signal controlling the pump in the synchronous operation from a characteristic diagram in which the control signal controlling the pump in the synchronous operation is read from the first characteristic curve.

2. The method according to claim 1, further comprising:

detecting a current longitudinal acceleration of the motor vehicle;

plotting, over time, the current longitudinal acceleration as a function of current volume consumption of the linear actuator in a second characteristic curve; and deriving the volume consumption threshold value from the second characteristic curve.

3. The method according to claim 2, further comprising:

detecting a current brake pressure applied to the hydraulic wheel brakes; and comparing the detected current brake pressure with a stored limit brake pressure.

4. The method according to claim 2, wherein deriving the volume consumption threshold value from the second characteristic curve uses a longitudinal acceleration$\geq$−4 m/s$^2$ and a current volume consumption$\geq$50% of a total volume $V_{tot}$.

5. The method according to claim 4, wherein deriving the volume consumption threshold value from the second characteristic curve uses a longitudinal acceleration$\geq$−6 m/s$^2$ and a current volume consumption$\geq$70% of a total volume $V_{tot}$.

6. The method according to claim 1, further comprising:

detecting a current brake pressure applied to the hydraulic wheel brakes; and comparing the detected current brake pressure with a stored limit brake pressure.

7. The method according to claim 1, further comprising:

detecting a current brake pressure applied to the hydraulic wheel brakes; and comparing the detected current brake pressure with a stored limit brake pressure.

8. The method according to claim 1, wherein the permanently stored maximum volume consumption value is substantially 11 cm$^3$.

\* \* \* \* \*